US012122118B2

(12) United States Patent
Speggiorin et al.

(10) Patent No.: US 12,122,118 B2
(45) Date of Patent: Oct. 22, 2024

(54) PACKAGING MACHINE FOR FORMING DOY-PACK BAGS

(71) Applicants: Lorenzo Speggiorin, Sarcedo (IT); Cristina Speggiorin, Sarcedo (IT); Marco Speggiorin, Sarcedo (IT)

(72) Inventors: Lorenzo Speggiorin, Sarcedo (IT); Cristina Speggiorin, Sarcedo (IT); Marco Speggiorin, Sarcedo (IT)

(*) Notice: Subject to any disclaimer, the term of this patent is extended or adjusted under 35 U.S.C. 154(b) by 0 days.

(21) Appl. No.: 18/256,190

(22) PCT Filed: Dec. 27, 2021

(86) PCT No.: PCT/IB2021/062338

§ 371 (c)(1),
(2) Date: Jun. 6, 2023

(87) PCT Pub. No.: WO2022/144750

PCT Pub. Date: Jul. 7, 2022

(65) Prior Publication Data

US 2024/0017515 A1 Jan. 18, 2024

(30) Foreign Application Priority Data

Dec. 30, 2020 (IT) ........................ 102020000032831

(51) Int. Cl.
*B31B 70/00* (2017.01)
*B31B 70/04* (2017.01)
(Continued)

(52) U.S. Cl.
CPC .............. *B31B 70/52* (2017.08); *B31B 70/04* (2017.08); *B31B 70/642* (2017.08); *B31B 2150/00* (2017.08)

(58) Field of Classification Search
CPC ....... B31B 70/26; B31B 70/52; B31B 70/266; B31B 70/02; B31B 70/00; B31B 70/04
See application file for complete search history.

(56) References Cited

U.S. PATENT DOCUMENTS 3,897,530 A * 7/1975 Leathers ................. B29C 53/10
264/209.3
4,008,650 A * 2/1977 Alter ......................... B65D 5/18
493/266
(Continued)

FOREIGN PATENT DOCUMENTS

CN 111 873 549 A 11/2020
EP 3 640 153 A1 4/2020
(Continued)

OTHER PUBLICATIONS

International Search Report and Written Opinion dated Jun. 14, 2022, issued in PCT Application No. PCT/IB2021/062338, filed Dec. 27, 2021.

*Primary Examiner* — Gloria R Weeks
(74) *Attorney, Agent, or Firm* — Workman Nydegger

(57) ABSTRACT

A packaging machine for forming doy-pack bags includes: a base; a reel-holding frame, configured to carry a reel of packaging film or a sheet-holding reel having a band with packaging sheets; a gripping and folding group configured to pick up and fold like a book, by facing two symmetrical parts thereof, either a portion of the packaging film or a packaging sheet; shaping apparatus for shaping a recessed bottom (B) of a doy-pack bag (A); a joiner for sealing the facing side edges of the two symmetrical parts either of a portion of the packaging film or of a packaging sheet;
(Continued)

pick-up apparatus adapted to remove the portion of the packaging film or the packaging sheet, folded and with the facing side edges sealed, from the gripping and folding group.

8 Claims, 8 Drawing Sheets

(51) Int. Cl.

| | |
|---|---|
| ***B31B 70/26*** | (2017.01) |
| ***B31B 70/52*** | (2017.01) |
| ***B31B 70/64*** | (2017.01) |
| *B31B 150/00* | (2017.01) |

(56) References Cited

U.S. PATENT DOCUMENTS 4,055,109 A * 10/1977 Kan .................... B65D 75/008 493/239
4,929,224 A * 5/1990 Hanson .................. B31B 70/00 493/194
5,083,999 A * 1/1992 Barta ................... B29C 65/008 493/405
5,246,416 A * 9/1993 Demura ................. B31B 70/36 493/443
5,938,337 A * 8/1999 Provan ................. B65B 61/188 53/139.2
7,285,083 B2 * 10/2007 Merken-Schiller .......................... B29C 66/4322 493/287
7,331,917 B2 * 2/2008 Totani ..................... B31B 70/00 493/379
10,040,613 B2 * 8/2018 Radosta ................ B65D 25/16
10,369,759 B2 * 8/2019 Totani ..................... B31B 50/81
10,406,771 B2 * 9/2019 Henry ................... B31B 70/266
10,967,599 B2 * 4/2021 Rapparini ............. B31B 70/644
2017/0283121 A1 * 10/2017 Bannister .............. B31B 70/004
2020/0148443 A1 * 5/2020 Boffelli .................. B65B 5/045
2020/0384717 A1 * 12/2020 Tanaka ................. B32B 15/082

FOREIGN PATENT DOCUMENTS

JP H08-72895 A 3/1996
WO 2018/211542 A1 11/2018

* cited by examiner

PACKAGING MACHINE FOR FORMING DOY-PACK BAGS

BACKGROUND OF THE INVENTION

1. The Field of the Invention

The invention relates to a packaging machine for forming doy-pack bags.

2. The Relevant Technology

Nowadays, self-supporting sealed pouches for product packaging are increasingly present on the market, particularly in the large-scale retail trade, which sealed pouches are made from a single piece of folded and welded packaging band.

Such a sealed pouch, known in jargon as a 'doy-bag' or 'doy-pack' pouch, has a bottom surrounded by lower supporting rest edges, two walls, joined one to the other laterally through the respective side edges, and an upper edge, normally designed to be opened for the fruition of the product contained in the pouch.

Generally, a vertical forming group is used for the realization of this type of pouches and comprises:

- a packaging band made of a plastic material;
- a shell for the deviation and shaping of the band, for the realization of a sealed pouch, from an inlet direction with an extended conformation to an outlet direction with a tubular conformation, and a shaping collar, placed to surround a forming tube and adapted to deviate the band being processed towards the forming tube;
- a forming tube, for the descent of material to be introduced into a pouch being made, which forming tube has a rear face thereof turned towards the side of the one or more approach rollers, and a front face, opposite to the rear face;
- first means for the arrangement to the mutual joining of a first pair of longitudinal portions of band, for the realization of an upper edge of a pouch in arrangement of use;
- and second means for the arrangement to the mutual joining of a second pair of longitudinal portions of band and of a third pair of longitudinal portions of band, for the realization of two corresponding side-by-side lower edges supporting the rest bottom of a pouch in arrangement of use, on the opposite side of the pouch with respect the upper edge.

The packaging band is normally a multilayer film made of plastic material.

This band is moved by means of tracks, belts or rollers placed on the sides of the forming tube, in an area underneath the shell, which tracks are adapted to press corresponding portions of the band against the forming tube to drag it downwards.

The completed sealed pouch finally drops to an underlying collection and handling means, such as a conveyor belt.

Such a forming group is obviously suited to industrial production, designed for large numbers, whereas nowadays the flourishing of small and medium-sized activities, often of a craft nature, capable of small numbers but with a high variety of products, requires more versatile and at the same time more economical machinery and equipment.

In addition, forming groups such as the one described above have the drawback of being able to work only and exclusively with tapes made of plastic material, where today there is an increasing need, driven by national and international legislation, to eliminate the use of plastics, particularly in the food industry.

In fact, known forming groups require the plastic band to be folded and placed under traction at angles, pressures and forces that a film made of paper material would not be able to withstand and would quickly tear.

SUMMARY OF THE INVENTION

The task of the present invention is to develop a packaging machine for forming doy-pack bags capable of overcoming the aforementioned drawbacks and limits of the prior art.

In particular, one object of the invention is to develop a packaging machine capable of operating with films or sheets of paper material.

Another object of the invention is to develop a highly versatile packaging machine.

A further object of the invention is to develop a packaging machine that is less complex and therefore less expensive than a known type of forming group.

Still, an object of the invention is to develop a compact packaging machine, that is, with a smaller footprint than that of a forming group of known type, which can therefore be easily set up inside a craft laboratory such as the one inside a bakery, a pastry shop or a pasta factory or the like.

The above-mentioned task and purposes are achieved by a packaging machine for forming doy-pack bags according to claim 1.

Further characteristics of the packaging machine according to claim 1 are described in the dependent claims.

BRIEF DESCRIPTION OF THE DRAWINGS

The aforesaid task and objects, together with the advantages that will be mentioned hereinafter, are indicated by the description of an embodiment of the invention, which is given by way of non-limiting example with reference to the attached drawings, where.

DETAILED DESCRIPTION OF THE PREFERRED EMBODIMENTS

With reference to the above-mentioned figures, a packaging machine for forming doy-pack bags according to the invention is indicated as a whole with number 10.

Figure 8:
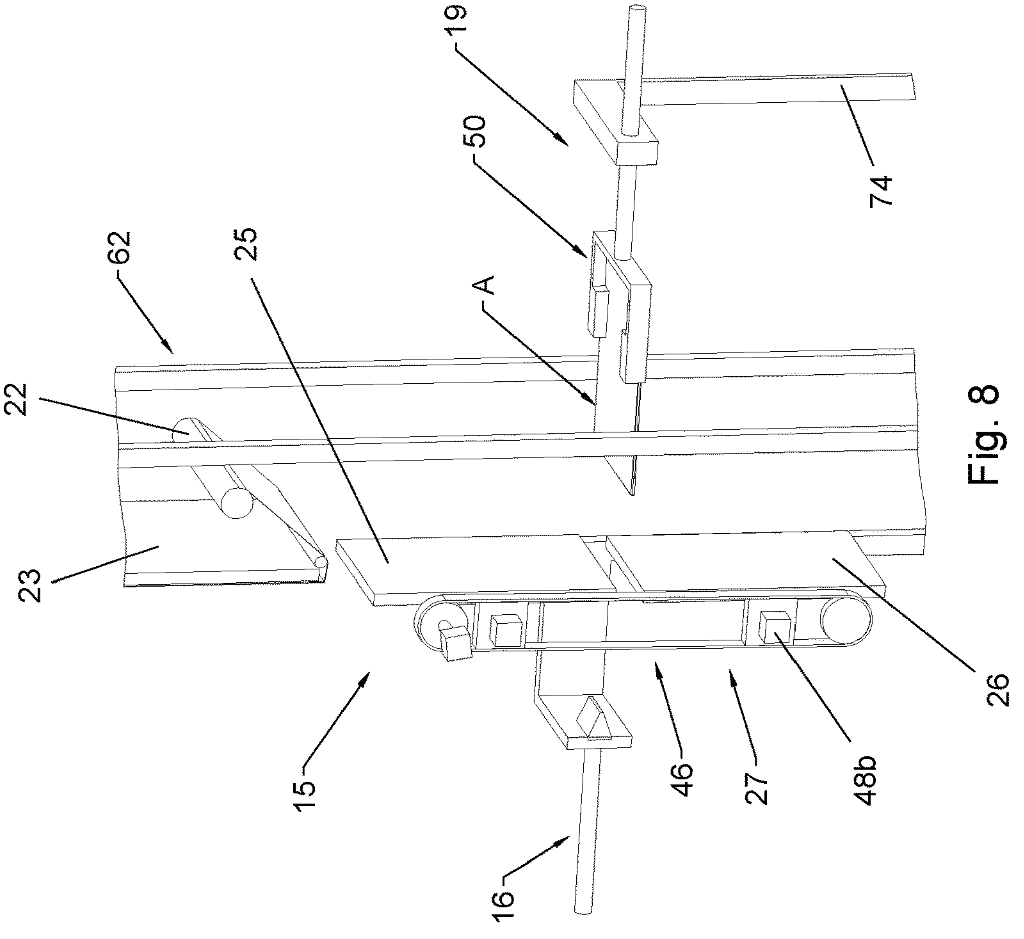
FIG. 8 represents a schematic perspective view of a seventh operating step of the packaging machine according to the invention.

This packaging machine 10 for forming doy-pack bags comprises:

- a base 11;
- a reel-holding frame 12, configured to carry a reel of a packaging film or a sheet-holding reel 13, the latter comprising a band on which packaging sheets 14 are fixed in a removable manner, as more fully described below and as exemplified in FIG. 14;
- a gripping and folding group 15 configured to pick up and fold like a book, by facing two symmetrical parts **14*a* and 14*b* thereof, either a portion of a packaging film or a packaging sheet 14, the latter being well exemplified in FIG. 13**;
- pushing means configured to shape an intermediate section **14*c* of the portion of film of the packaging sheet 14 in such a way that said intermediate section 14*c* folds by arranging itself between the two symmetrical parts 14*a* and 14*b* arranged facing each other, said pushing means thus defining a recessed bottom B of a doy-pack bag A, the latter schematically shown in the broken perspective view of FIG. 9; the pushing means are supported by corresponding handling means 17, schematically shown in FIG. 1, configured to move the same pushing means either towards a packaging film or towards a packaging sheet 14 when the latter is retained by the gripping and folding group 15, as highlighted in FIG. 6**;
- joining means 18 and 118 for sealing the facing side edges C1, C2, C3, C4 of said two symmetrical parts **14*a* and 14*b* either of a portion of the packaging film or of the packaging sheet 14**;
- pick-up means 19, configured to remove the portion of the packaging film or the packaging sheet 14, folded and with the facing side edges C1, C2, C3, C4 sealed, from the gripping and folding group 15, as schematically shown in FIG. 8.

In the figures, an embodiment of the packaging machine 10 according to the invention in which a sheet-holding reel 13 is present is exemplified, but the variant embodiment in which a reel of a packaging film is used is obviously also to be understood as being part of the invention.

Figure 9:
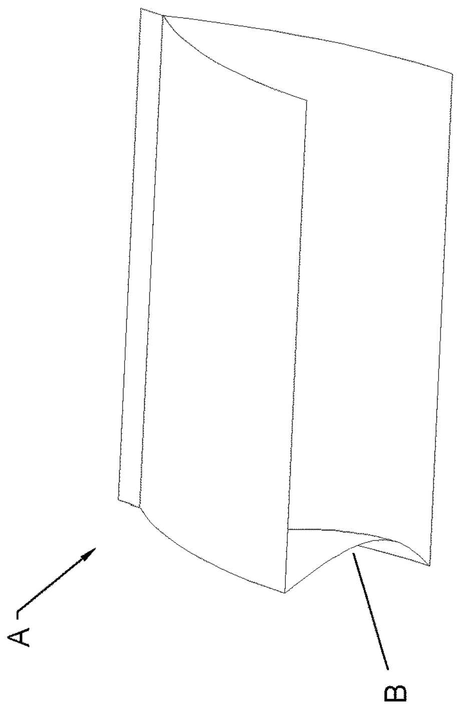
FIG. 9 represents a broken perspective view of a doy-pack bag made with a packaging machine according to the invention.

In the present embodiment, the pushing means comprise a shaping punch 16 for shaping a recessed bottom B of a doy-pack bag A, the latter schematically shown in the broken perspective view of FIG. 9.

Figure 1:
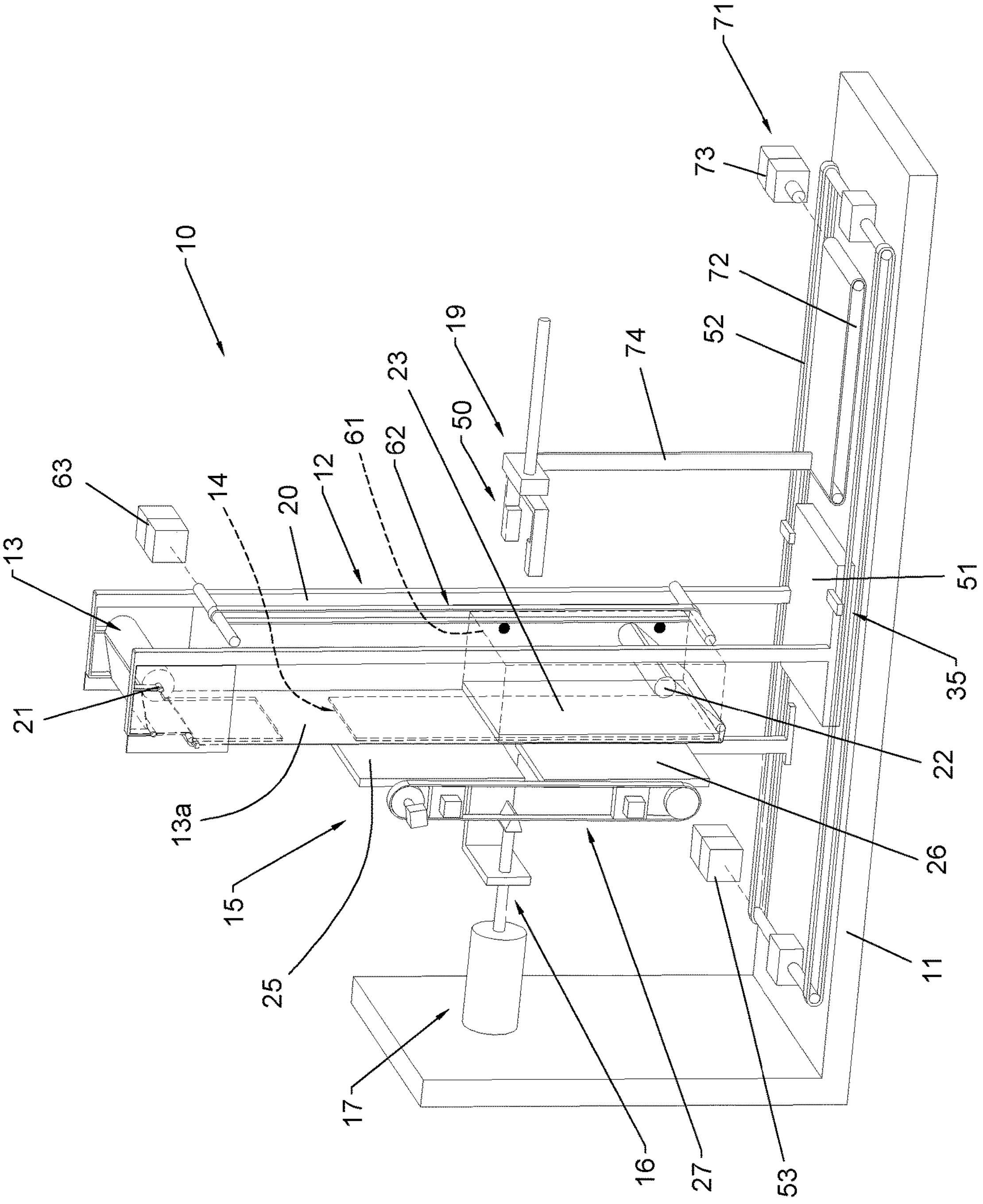
FIG. 1 represents a schematic perspective view of the packaging machine according to the invention.
Figure 6:
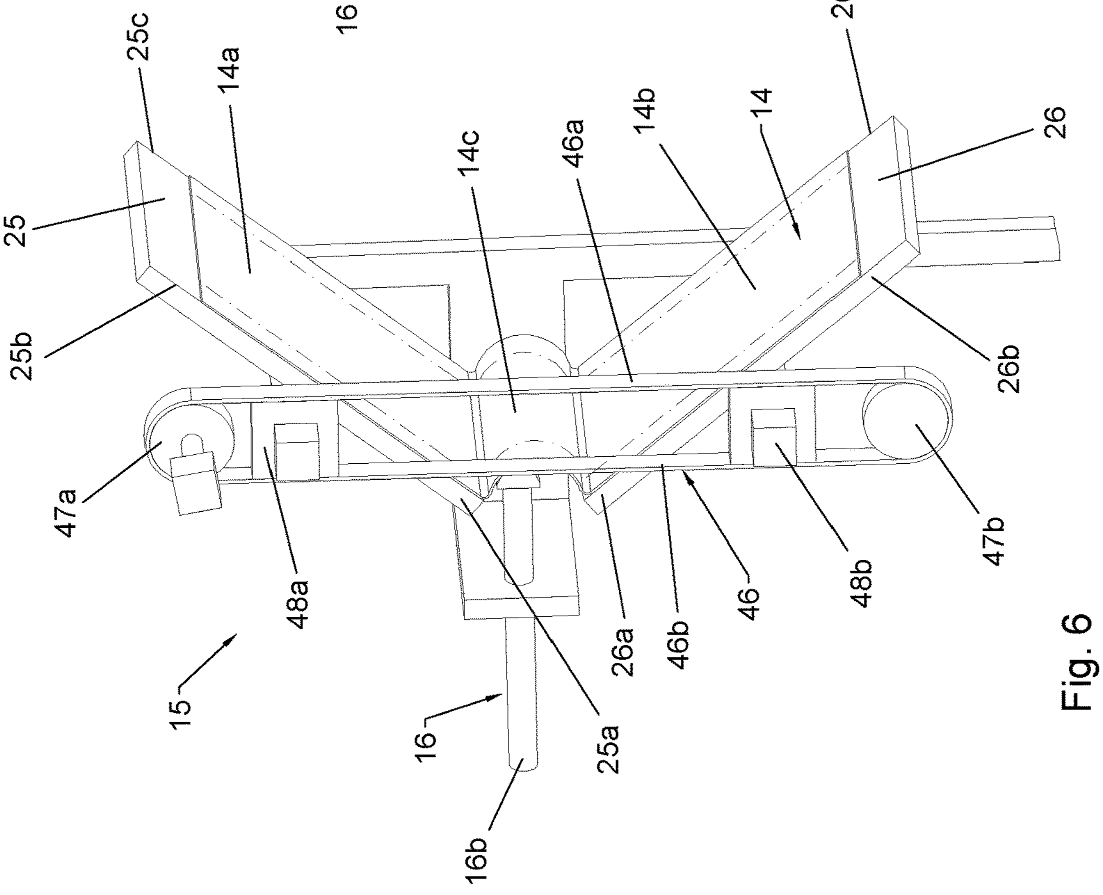
FIG. 6 represents a schematic perspective view of a fifth operating step of the packaging machine according to the invention.

The shaping punch 16 is supported by corresponding handling means 17, schematically shown in FIG. 1, configured to move said shaping punch 16 either against a packaging film or against a packaging sheet 14 when the latter is retained by the gripping and folding group 15, as highlighted in FIG. 6.

In an alternative embodiment of the packaging machine according to the invention, not illustrated for simplicity's sake, the pushing means comprise a pressurized fluid ejection device configured and positioned to push the intermediate section **14*c* of said portion of film or of said packaging sheet 14 by means of an ejected fluid, so that said intermediate section 14*c* folds by arranging itself between the two symmetrical parts 14*a* and 14*b*** arranged facing each other.

Again, by way of example, such a pressurized fluid ejection device may be an air compressor, or another device for emitting a gaseous fluid.

Again, by way of example, such a pressurized fluid ejection device may be a pump for water, or another device for emitting a liquid.

In the present non-limiting embodiment of the invention, the reel-holding frame 12 comprises:

- a supporting structure 20, for example fixed to the base 11;
- a reel-holding shaft 21 at one end of the supporting structure 20, for example at the upper end;
- a scrap collection reel 22 at the opposite end of the supporting structure 20;
- blocking means configured to stop either a portion of the packaging film or a portion of band **13*a* of a sheet-holding reel 13 at a packaging sheet 14, said blocking means being arranged between said reel-holding shaft 21 and said scrap collection reel 22, and being positioned facing the gripping and folding group 15**.

In the present embodiment, the blocking means comprise a suction table 23, provided with suction holes and corresponding suction ducts for retaining the band **13*a* of the sheet-holder reel 13** against it.

The suction is performed by a suction pump 24 connected to this suction table 23 with a corresponding pneumatic line **24*a*, as schematically exemplified in FIG. 1**A.

The suction table 23 is adapted to block the band **13*a* when a packaging sheet 14 is positioned facing the gripping and folding group 15**, as better described below.

Figure 7:
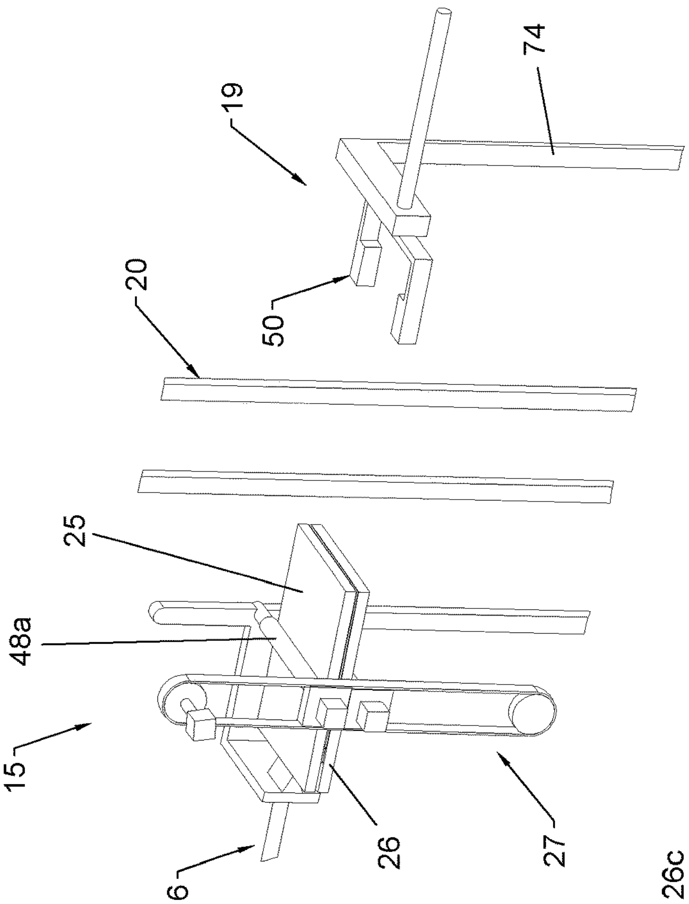
FIG. 7 represents a schematic perspective view of a sixth operating step of the packaging machine according to the invention.

This gripping and folding group 15 comprises:

- two folding plates 25 and 26, a first upper plate 25 and a second lower plate 26, with suction holes for gripping a portion of a packaging film or a packaging sheet 14;
- means 27 of opposing roto-translation of the folding plates 25 and 26 from a co-planar arrangement thereof for gripping a portion of the packaging film or a packaging sheet 14, depicted in FIGS. 1 to 5, to an arrangement in which the folding plates 25 and 26 are facing and under pressure one on the other at least at the side edges **25*b*, 25*c*, 26*b*, 26*c* of the same folding plates 25 and 26, as shown in FIGS. 6 and 7**;
- suction means 30 configured for suction from the folding plates 25 and 26.

The suction means 30, for example, comprise the suction pump 22, a second pneumatic line **24*b* for the suction from the first upper folding plate 25, a third pneumatic line 24*c* for the suction from the second lower folding plate 26, and corresponding suction holes defined at least on the side edges 25*b*, 25*c*, 26*b*, 26*c* of the same folding plates 25 and 26, but possibly also in other areas of said folding plates 25 and 26**.

The means of opposing roto-translation 27 comprise, for example, a belt 46 between a motorised pulley 47*a* and an idler pulley 47*b*, wherein a first branch 46*a* of the belt 46 is fixed to the motorised pin 48*a* of the upper plate 25, and a second branch 46*b* of the belt 46 is fixed to the motorised pin 48*b* of the lower plate 26.

The synchronisation and coordination of the motors driving the belt 46 and the motorised pins 48*a* and 48*b* result in the roto-translational movement of the folding plates 25 and 26.

The packaging machine 10 comprises relative handling means 35 configured to bring said gripping and folding group 15, with said folding plates 25, 26 in co-planar gripping arrangement, closer to said reel-holding frame 12.

In the present embodiment, said relative handling means 35 are configured to translate the reel-holding frame 12 alternately towards and away from the gripping and folding group 15.

In particular, and still by way of example, such relative handling means 35 comprise a movable slide 51 placed to slide on the base 11 and driven by a belt system 52 with a gear motor 53, as exemplified in FIG. 1.

In the present embodiment, the packaging machine 10 comprises a sheet-holding reel 13.

The reel-holding frame 12 also comprises translation means for the scrap collection reel 22 and for the suction table 23, which are configured to move said scrap collection reel 22 and said suction table 23 in such a way that, when a packaging sheet 14 is blocked by the folding plates 25 and 26, the band 13*a* of the sheet-holding reel 13 is separated from the packaging sheet 14 itself.

Figure 13:
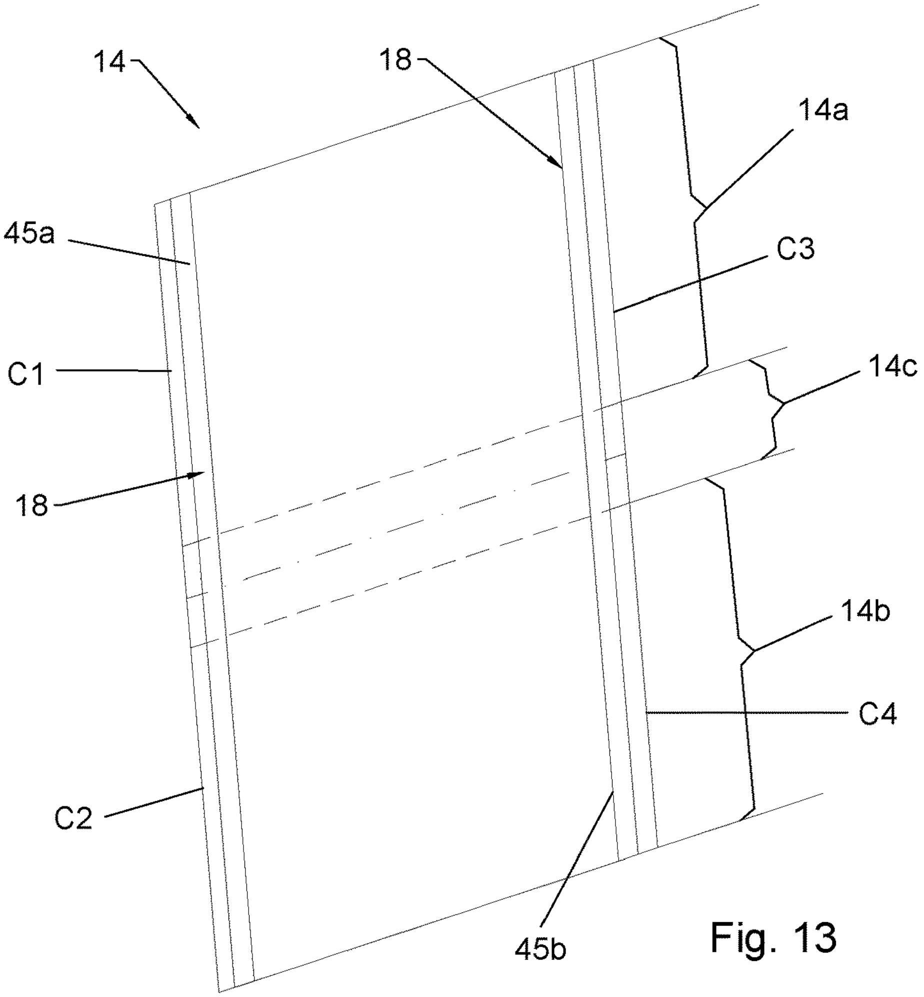
FIG. 13 represents a schematic view of a packaging sheet used in the packaging machine according to the invention.
Figure 14:
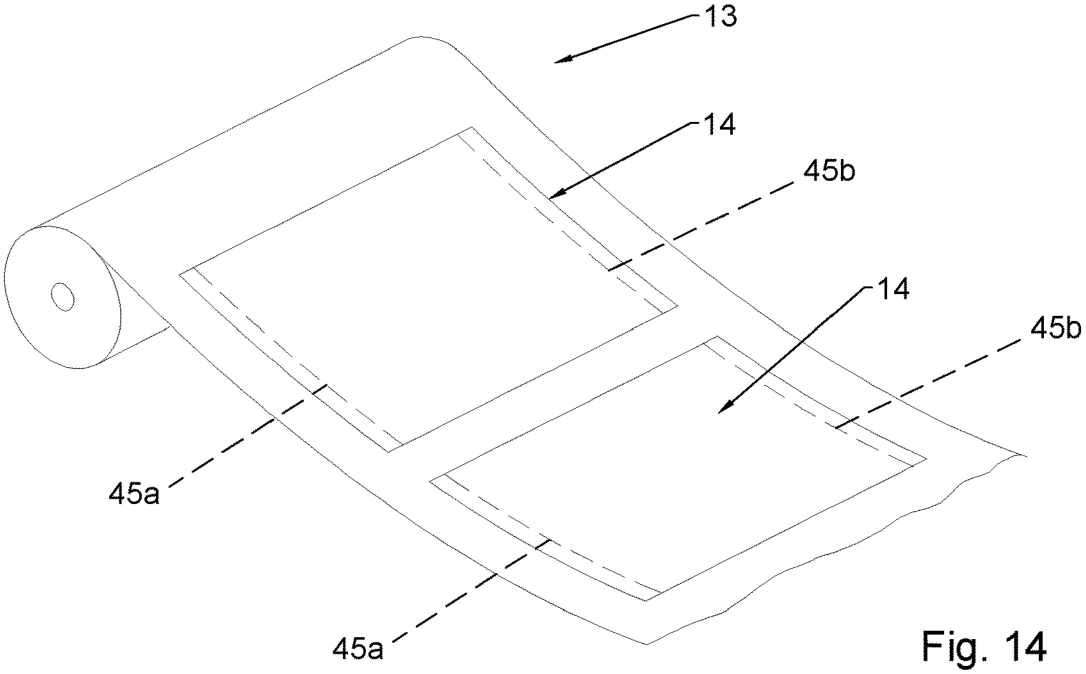
FIG. 14 represents a schematic view of a sheet-holding reel used in the packaging machine according to the invention

Each packaging sheet 14 comprises two adhesive strips 45*a* and 45*b*, clearly visible in FIG. 13, each defined on one of the side edges C1, C2, C3, C4 of the two symmetrical parts 14*a*, 14*b* of the packaging sheet 14.

These adhesive strips 45*a* and 45*b* cause the packaging sheet 14 to be joined with the transport band 13*a*.

A packaging sheet 14 is then blocked by the folding plates 25 and 26 and moved away from the band 13*a*.

The translation means comprise a movable body 61, schematically shown in FIG. 1, driven vertically by means of a belt system 62 provided with a gear motor 63.

Such a belt system 62 may comprise one or more belts.

The movable body 61 is fixed to the belt, or belts, by means of corresponding connecting elements.

The shaping punch 16 comprises a wedge-shaped head 16*a* and a stem 16*b* supporting said wedge-shaped head 16*a*.

The shaping punch 16 is intended to be able to have a disc-shaped head, or a head of another similar and technically equivalent shape.

The handling means 17, for example for handling the shaping punch 16, comprise a linear actuator 40 configured to translate said stem 16*b* so that the wedge-shaped head 16*a* is arranged in the interspace between the facing inner edges 25*a*, 26*a* of said two folding plates 25 and 26, as in FIG. 6.

The shaping punch 16 is configured to operate with thrust on an intermediate section 14*c* of the portion of film or of a packaging sheet 14, so that said intermediate section 14*c* is recessed between two symmetrical parts 14*a* and 14*b* of the packaging sheet 14 for defining a recessed bottom B of a doy-pack bag A, as visible in FIGS. 6 and 9.

In the present embodiment, the joining means 18 comprise:

- the folding plates 25 and 26;
- the means 27 of opposing roto-translation of the folding plates 25 and 26 from a co-planar arrangement thereof for gripping a portion of a film or a packaging sheet 14, to an arrangement in which the folding plates 25 and 26 are facing and under pressure one on the other at least at said side edges 25*b*, 25*c*, 26*b*, 26*c;*
- an adhesive strip 45*a*, 45*b* defined on at least one of two facing side edges C1, C2, C3, C4 of the two symmetrical parts 14*a*, 14*b*.

The adhesive strips 45*a* and 45*b* cause the mutual fixing of the two symmetrical parts 14*a* and 14*b* of the packaging sheet 14.

Figure 11:
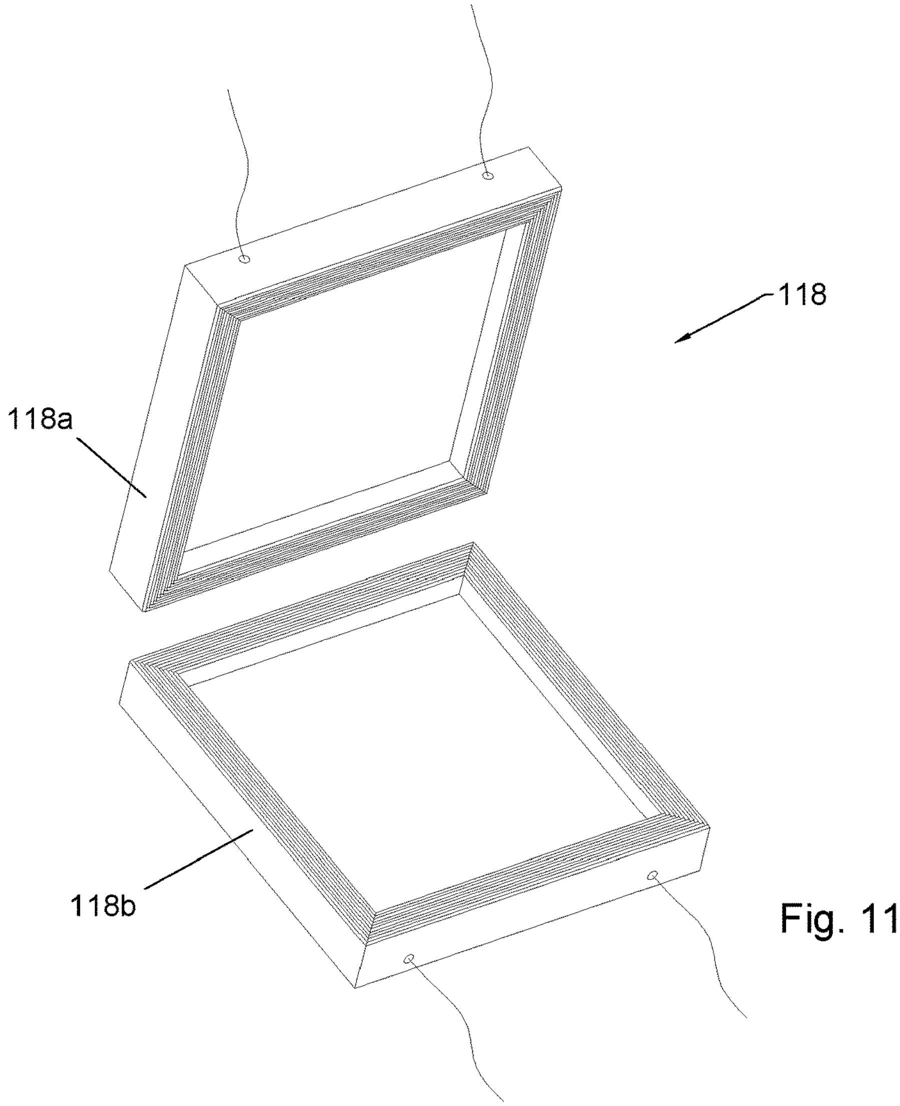
FIG. 11 represents a perspective view of a variant embodiment of a detail of the packaging machine according to the invention.
Figure 12:
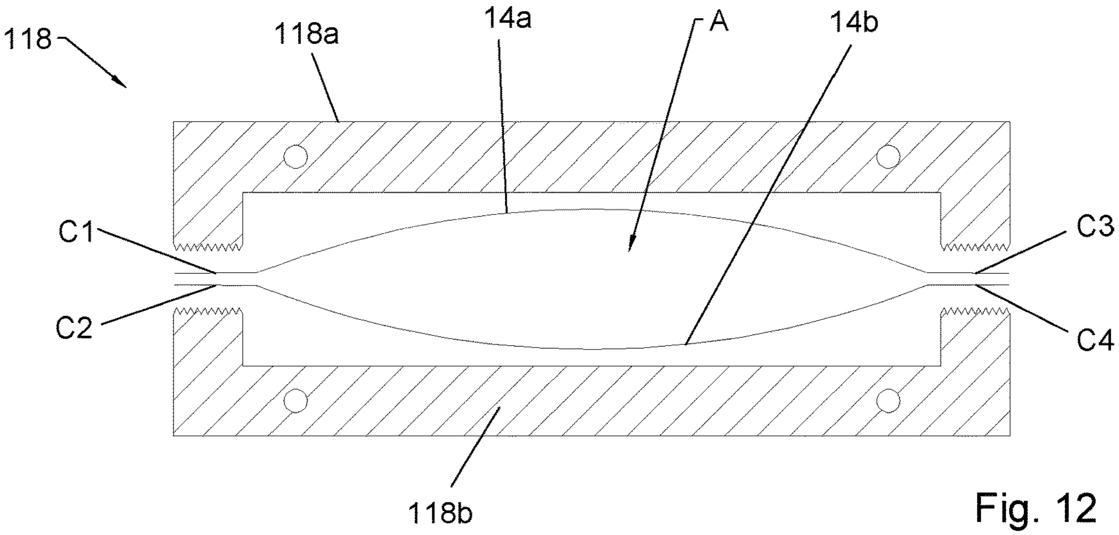
FIG. 12 represents a schematic sectional view of the detail of FIG. 11.

In an alternative embodiment, wherein the packaging machine comprises a reel of packaging film, for example made of plastic material, the joining means 118, schematically shown in FIGS. 11 and 12, comprise two sealing plates 118*a* and 118*b*, provided with toothed and heated sidewalls, configured to cause the sealing of the facing edges C1 and C2 and C3 and C4 of a folded portion of film.

Figure 10:
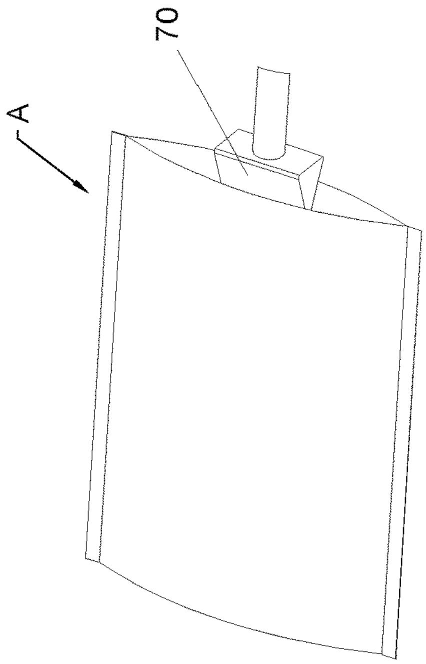
FIG. 10 represents a detail of the packaging machine according to the invention.

The packaging machine 10 according to the invention may further comprise an anti-sealing insert 70, configured to be interposed between the two facing upper edges A1 and A2 of a doy-pack bag A being made, to prevent them from sealing against each other; said anti-sealing insert 70 is exemplified in FIG. 10.

Said anti-sealing insert 70 is supported and handled by handling means configured to bring it between the two upper edges A1 and A2 in the step of closing the folding plates 25 and 26; said handling means are intended to be able to be of a type known per se, for example similar to the handling means 71 defined below in the context of the description of the pick-up means 19.

The pick-up means 19 comprise a gripper 50 and corresponding handling means 71 for the gripper 50 between an advanced operating arrangement, as shown in FIG. 8, and a retracted rest arrangement, as in FIG. 1.

Such handling means 71 comprise, for example, a belt or band system 72 with a gear motor 73, on which belt system a support 74 for the gripper 50 is mounted.

Figure 1A:
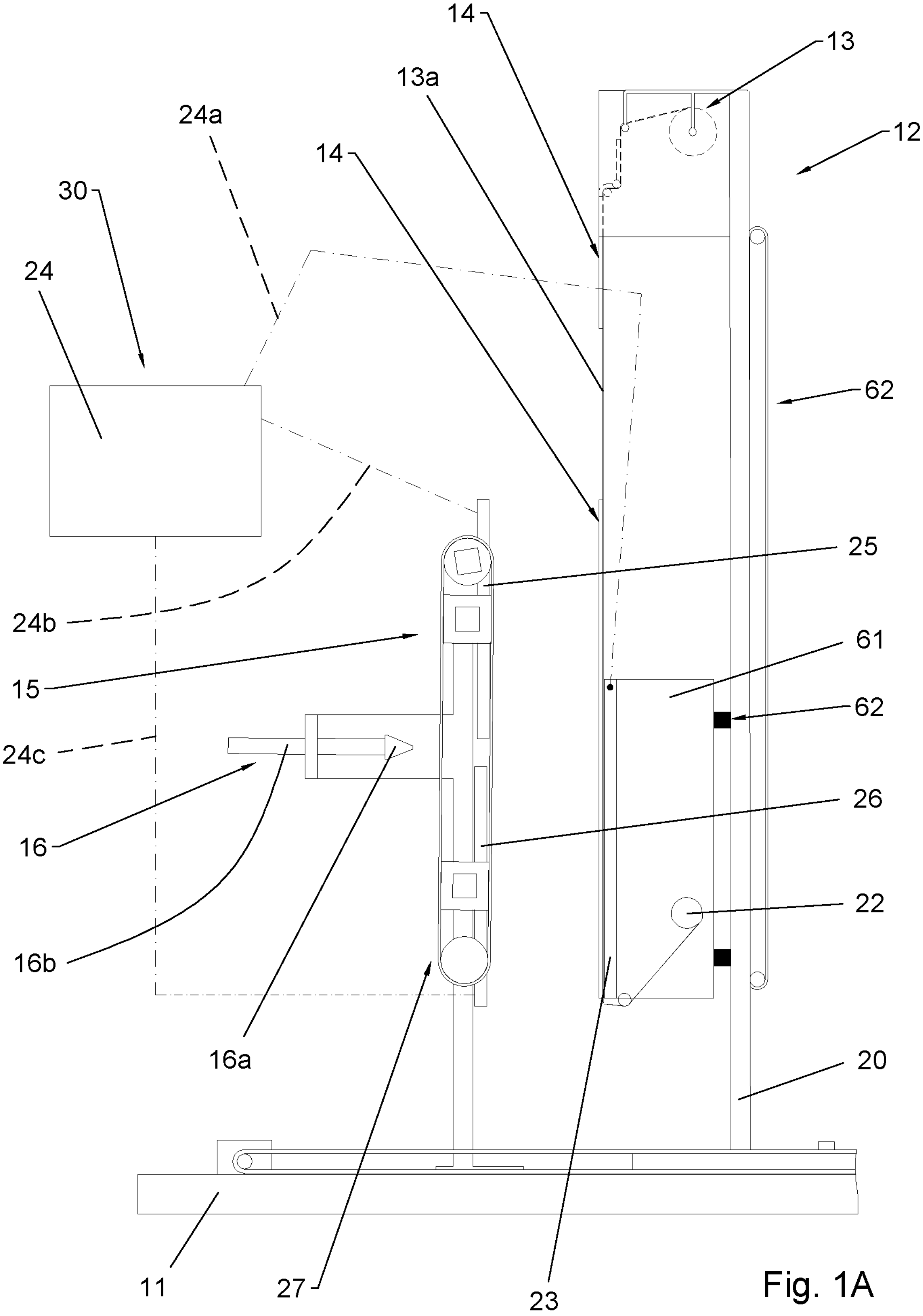
FIG. 1A represents a schematic side view of a portion of the packaging machine according to the invention.
Figure 3:
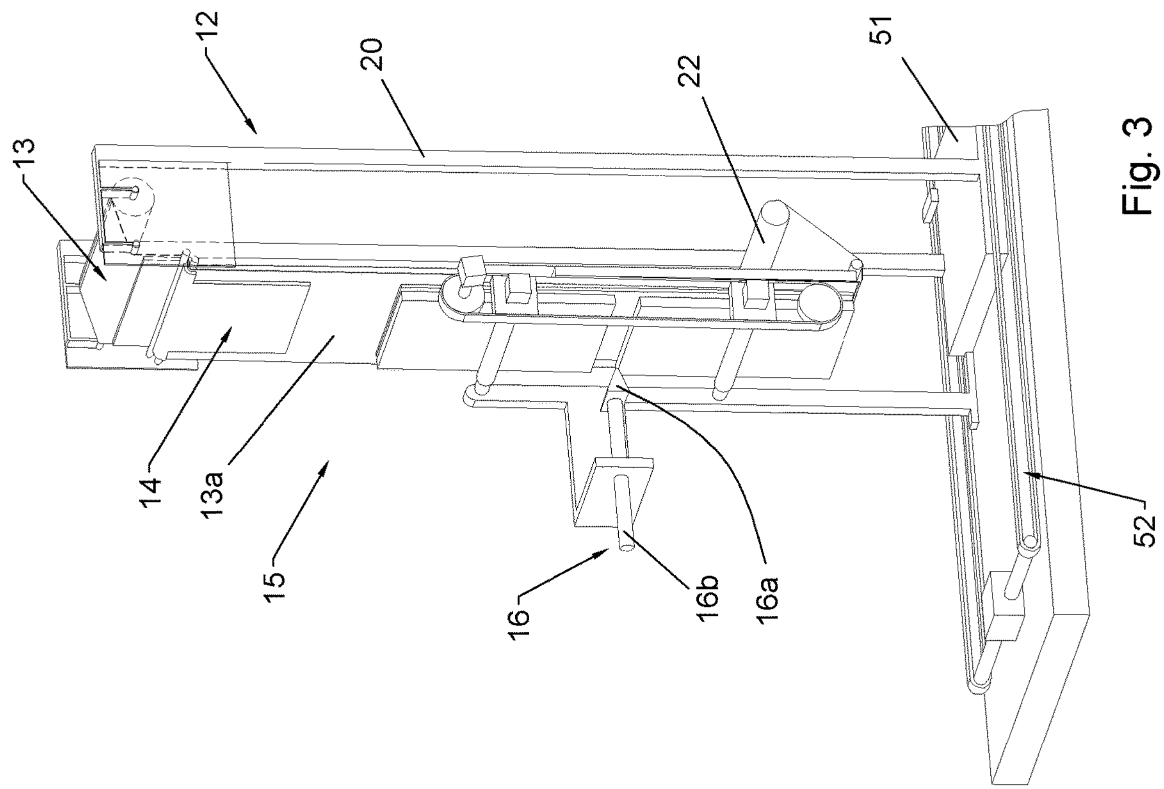
FIG. 3 represents a schematic perspective view of a second operating step of the packaging machine according to the invention.
Figure 2:
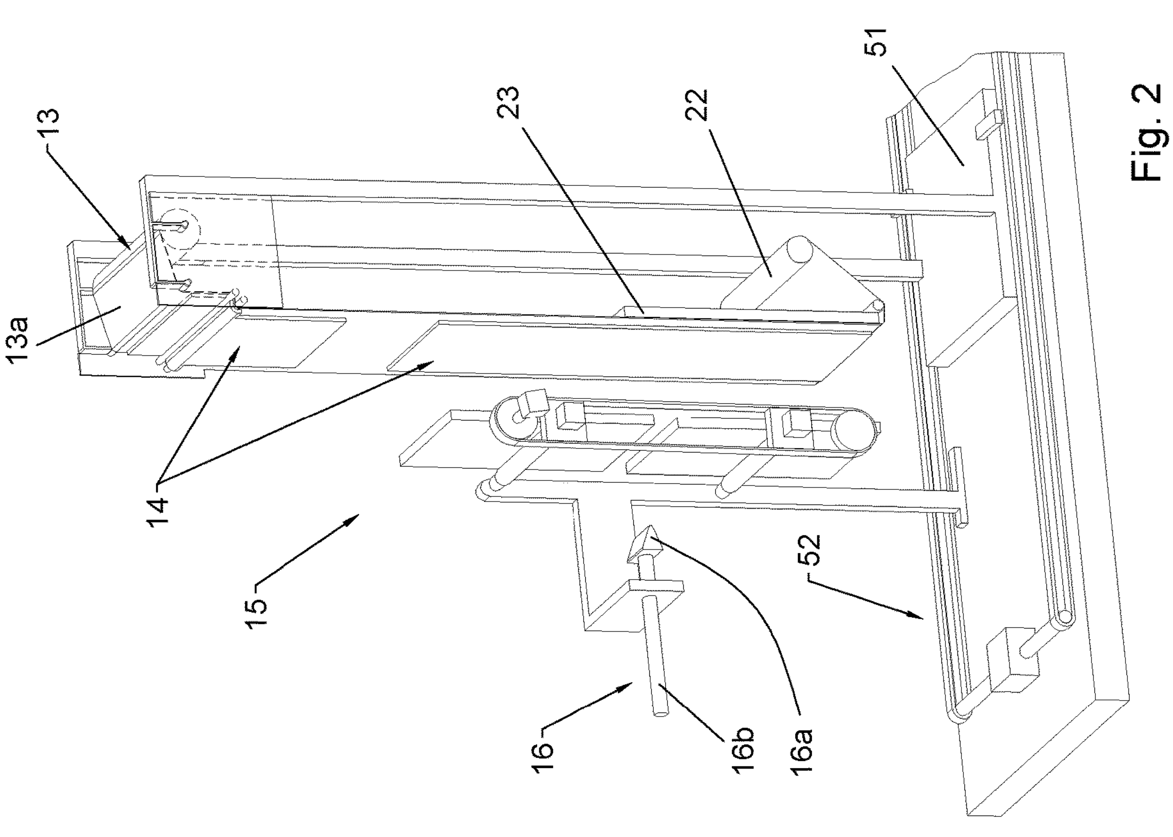
FIG. 2 represents a schematic perspective view of a first operating step of the packaging machine according to the invention.
Figure 5:
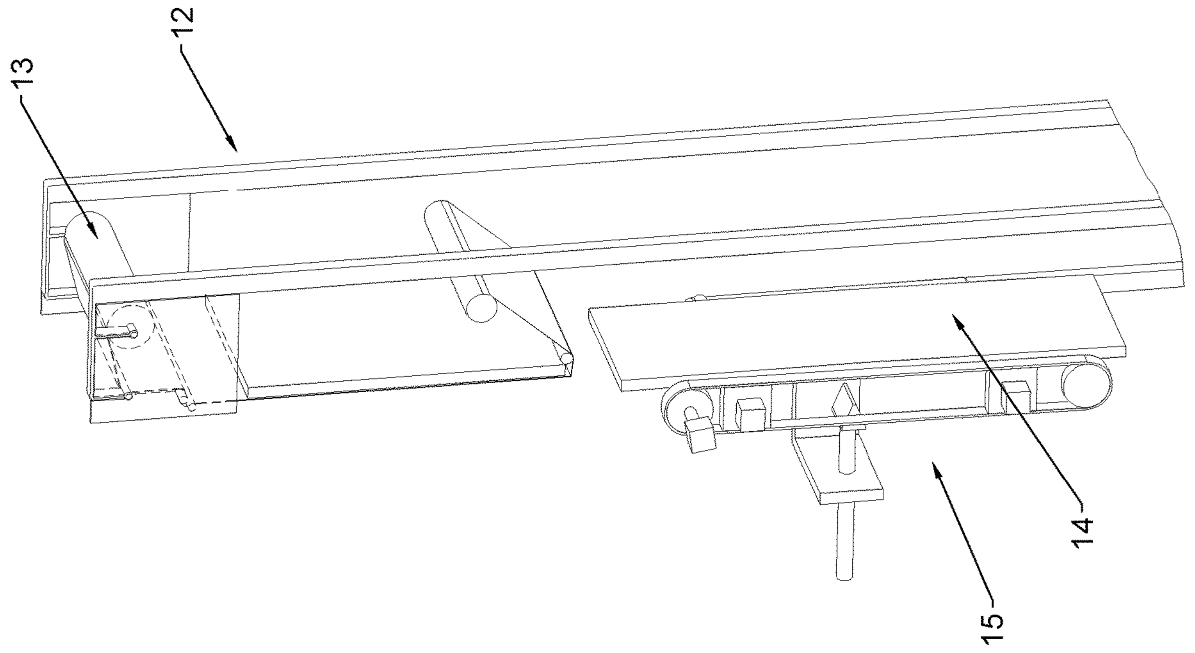
FIG. 5 represents a schematic perspective view of a fourth operating step of the packaging machine according to the invention.
Figure 4:
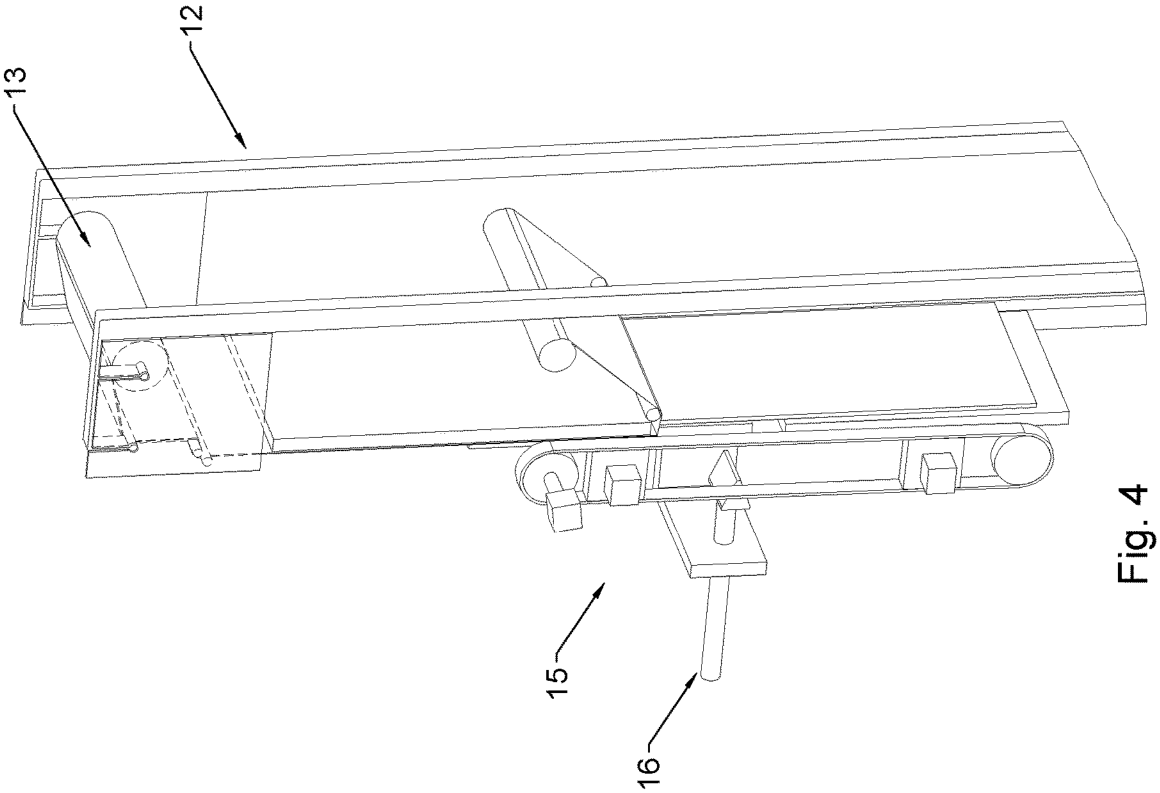
FIG. 4 represents a schematic perspective view of a third operating step of the packaging machine according to the invention.

The object of the invention is also intended to be a method of use of a packaging machine 10 as described above for forming a doy-pack type bag, characterized in that it comprises the following operating steps:

- a first step of defining a portion of a packaging film or preparing a packaging sheet 14 taken from a corresponding reel (FIGS. 1, 1A and 2);
- a second step of folding into two said portion of film or said packaging sheet 14, with definition of two symmetrical parts 14*a*, 14*b* which are facing, with a simultaneous pushing operation, on an intermediate section 14*c*, of said portion of film or of said packaging sheet 14, in order to be recessed between said two symmetrical parts 14*a*, 14*b* for the definition of a recessed bottom B of a doy-pack bag A; said second step is schematically shown in FIGS. 6 and 7;
- a third step of sealing the facing side edges C1, C2, C3, C4 of said two symmetrical parts 14*a*, 14*b*; this third step is exemplified in FIGS. 7, 11 and 12.

Between the first and second steps there is provided an intermediate step of gripping a portion of a packaging film, or a packaging sheet 14, by the gripping and folding group 15.

In particular, the packaging sheets 14 are made of paper material.

Again in particular, and by way of example, such packaging sheets 14 are made of paper material for food packaging.

The particular use of a sheet-holding reel, said sheet-holding reel 13 being of the type comprising a supporting band 13*a* on which a series of packaging sheets 14 are fixed in a removable manner, in a packaging machine 10 as described above, as well as in a method of use of a packaging machine 10 for forming a doy-pack type bag as described above, is also intended to be an object of the invention.

In particular, the packaging sheets 14 may be made of paper material.

It is also intended to form an object of the invention a sheet-holding reel 13, comprising a supporting band 13*a* to which a series of packaging sheets 14 are fixed in a removable manner, wherein the packaging sheets 14 are made of paper material.

The supporting band 13*a* is intended to be of plastic material.

Alternatively, the supporting band 13*a* is made of paper material.

Practically, it has been established that the invention achieves the intended task and objects.

In particular, the invention has developed a packaging machine capable of operating with films or sheets of paper material.

In addition, the invention has developed a highly versatile packaging machine.

In addition, the invention has developed a packaging machine that is less complex and therefore less expensive than a forming group of known type.

Furthermore, with the invention a compact packaging machine has been developed, that is, with a smaller footprint than that of a forming group of known type, which can therefore be easily set up inside a craft laboratory such as the one inside a bakery, a pastry shop or a pasta factory or the like.

The invention thus conceived is susceptible of numerous modifications and variants, all of which are within the scope of the inventive concept; moreover, all the details may be replaced by other technically equivalent elements.

In practice, the components and materials used, as well as the dimensions and shapes, as long as they are compatible with the specific use, can be any according to requirements and the state of the art.

If the characteristics and techniques mentioned in any claim are followed by reference signs, these reference signs are to be intended for the sole purpose of increasing the intelligibility of the claims and, consequently, such reference signs have no limiting effect on the interpretation of each element identified by way of example by these reference signs.

The invention claimed is:

1. A packaging machine for forming doy-pack bags, comprising:

a base;

a reel-holding frame, configured to carry a reel of packaging film or a sheet-holding reel comprising a band to which packaging sheets are fixed in a removable manner;

a gripping and folding group configured to pick up and fold like a book, by facing two symmetrical parts thereof, either a portion of said packaging film or a packaging sheet;

pushing means configured to shape an intermediate section of said portion of film or of said packaging sheet, so that said intermediate section folds and arranges itself between said two symmetrical parts arranged facing each other, said pushing means defining a recessed bottom of a doy-pack bag;

joining means for sealing the facing side edges of said two symmetrical parts either of a portion of said packaging film or of a packaging sheet;

pick-up means, configured to remove said portion of said packaging film or said packaging sheet, folded and with the facing side edges sealed, from said gripping and folding group;

wherein said reel-holding frame comprises:

a supporting structure;

a reel-holding shaft at one end of the supporting structure;

a scrap collection reel at the opposite end of the supporting structure;

blocking means configured to stop either a portion of said packaging film or a portion of band of a sheet-holding reel at a packaging sheet, said blocking means being arranged between said reel-holding shaft and said scrap collection reel, and being positioned facing said gripping and folding group;

and in that said gripping and folding group comprises:

two folding plates with suction holes for gripping a portion of said film or a packaging sheet;

means of opposing roto-translation of the folding plates from a co-planar arrangement thereof for gripping a portion of film or a packaging sheet, to an arrangement in which said folding plates are facing and under pressure one on the other at least at the side edges of the same folding plates;

suction means configured for suction from said folding plates;

said packaging machine comprising relative handling means configured to bring said gripping and folding group, with said folding plates in co-planar gripping arrangement, closer to said reel-holding frame.

2. The packaging machine according to claim 1, wherein said pushing means are supported by corresponding handling means configured to move said pushing means towards said packaging film or towards said packaging sheet when the latter is retained by said gripping and folding group.

3. The packaging machine according to claim 1, wherein said pushing means comprise a shaping punch for shaping a recessed bottom of a doy-pack bag, said shaping punch being supported by corresponding handling means configured to move said shaping punch against said packaging film or against said packaging sheet when the latter is retained by said gripping and folding group.

4. The packaging machine according to claim 3, wherein said shaping punch comprises a wedge-shaped head and a stem supporting said wedge-shaped head.

5. The packaging machine according to claim 1, wherein said joining means comprise:

said folding plates;

said means of opposing roto-translation of the folding plates from a co-planar arrangement thereof for gripping a portion of film or a packaging sheet, to an arrangement in which said folding plates are facing and under pressure one on the other at least at said side edges;

an adhesive strip defined on at least one of two facing side edges of said two symmetrical parts.

6. A method of use of the machine according to claim 1, for forming a doy-pack bag, comprising the following operating steps:

a first step of defining a portion of a packaging film or preparing a packaging sheet taken from a corresponding reel;

a second step of folding into two said portion of film or said packaging sheet, with definition of two symmetrical parts which are facing, with a simultaneous pushing operation, on an intermediate section of said portion of film or of said packaging sheet, in order to be recessed between said two symmetrical parts for the definition of a recessed bottom of a doy-pack bag;

a third step of sealing the facing side edges of said two symmetrical parts.

7. The method according to claim 6, wherein between said first and second steps there is an intermediate step of gripping a portion of a packaging film, or a packaging sheet, by said gripping and folding group.

8. The method according to claim 6, wherein said packaging sheets are made of paper material.

* * * * *